United States Patent [19]

Velasco, Jr. et al.

[11] 4,335,649
[45] Jun. 22, 1982

[54] METHOD AND APPARATUS FOR PRODUCING MASA CORN

[75] Inventors: Ralph E. Velasco, Jr.; A. G. Pinson, both of San Antonio, Tex.

[73] Assignee: Amigos Food Company, Inc., San Antonio, Tex.

[21] Appl. No.: 155,489

[22] Filed: Jun. 2, 1980

[51] Int. Cl.³ .................... A47J 27/04; B01F 13/02
[52] U.S. Cl. ........................ 99/327; 99/335; 99/348; 99/486; 99/517; 366/107; 426/618
[58] Field of Search .............. 99/348, 327, 516, 330, 99/517, 332, 534, 335, 536, 486; 366/101, 106, 107; 426/474, 476, 510, 511, 618

[56] References Cited

U.S. PATENT DOCUMENTS

| | | |
|---|---|---|
| 2,205,525 | 6/1940 | Goebels . |
| 3,345,181 | 10/1967 | Smith, Jr. . |
| 3,881,702 | 5/1975 | McIver . |
| 4,205,601 | 6/1980 | Velasco .............................. 99/348 |

*Primary Examiner*—Philip R. Coe
*Assistant Examiner*—Timothy F. Simone
*Attorney, Agent, or Firm*—Gunn, Lee & Jackson

[57] ABSTRACT

To practice the method of this invention, a large stainless steel tank having a conical bottom is utilized for the mass cooking of corn to produce masa. Connected to the conical bottom of the tank is a multiplicity of steam rings interconnected by a manifold to an external source of steam. A conical screen is positioned closely adjacent the conical bottom to facilitate the injection of steam for heating the contents and selective injection of air for stirring the corn in the cooking or steeping process. Interspersed closely adjacent to the steam rings are air injection rings receiving compressed air from the surge tank connected to a compressor. Selective injection of compressed air sequentially from the inner air ring followed by injection through the intermediate air ring and the outer air ring stirs the liquid and corn content of the tank in the process of cooking or steeping.

The steps of the method of the process of this invention include heating and steeping of corn, water, and calcium hydroxide mixture for predetermined period. Selective injection of air through the bottom of the container stirring the steeping mixture, the pumping of fluid from the bottom of the container and discharging the fluid into the top of the container followed by sequential repetition of the foregoing steps until the corn content is cooked or steeped to a desired texture for producing masa followed by the processing the corn into masa.

12 Claims, 9 Drawing Figures

METHOD AND APPARATUS FOR PRODUCING MASA CORN

BACKGROUND OF THE INVENTION

A method and apparatus of automatically cooking and steeping of corn in large quantities incorporating steps including heating the corn and water with steam and stirring by a controlled injection of air.

DESCRIPTION OF PRIOR ART

In the early art of processing corn for production of masa corn, the cook would steep the corn in small lots of a few bushels in containers having capacity of less than 20 bushels. Mass corn volume cookers have been used with mechanical stirrers giving poor results. Various containers for related purposes have been developed and patented, such as U.S. Patent to Smith, U.S. Pat. No. 3,345,181 for roasting and cooling coffee beans. Air has been utilized for mixing pulverized materials, such as in U.S. Patent to Goebels, U.S. Pat. No. 2,205,525, and McIver, U.S. Pat. No. 3,881,702.

The method and device of this invention differs from the prior art in the cooking of large quantities of corn by heating the mass of liquid and corn with injected steam and steeping and cooling the mass while periodically stirring with air. Mechanical stirrers break up and crush cooked or steeped masa corn whereas the selective stirring with the injection of air of this invention stirs, distributes heat, and evenly cools the corn producing masa of the highest quality without breakage.

BRIEF SUMMARY OF THE INVENTION

The large stainless steel tank of this invention is constructed with a conical bottom having integrally constructed and encircling steam rings connected by a manifold to an external source of steam. A conical screen is positioned closely adjacent the conical bottom to facilitate steam injection and water recirculation and selective air injection for stirring. A multiplicity of small orifices are drilled in the conical bottom projecting into the steam rings evenly admitting steam into the interior of the tank. A multiplicity of air injection rings are spaced between the steam rings with each ring having a multiplicity of air inlet risers projecting through the conical bottom terminating adjacent the screen. The equipment and process provides for cooking large quantities of corn in a cooking liquid, steeping and gradually cooking the corn and liquid over a period of time removing the husks. In the steeping and cooling process, selective air injection is utilized normally in a cycle from the center outward rolling or tumbling the mass of corn and liquid to rotate the hot center section to the outer edge of the container for even cooling. The external source of compressed air is filtered dehydrated and produces potable air meeting the highest of health standards. The conical bottom of a tank has attached three air rings. The inner ring has two air inlet pipes or discharges adjacent the apex of the inverted conical screen. The intermediate air ring has four discharge orifices at the end of the air inlet risers adjacent the inner surface of the conical screen. The third air ring adjacent the wall of the tank has eight evenly spaced discharged orifices adjacent the point of contact of the conical screen by the air inlet risers.

Corresponding to each ring is a first, second and third air control valve. Injection of air in sequence at the bottom of first air ring followed by injection at the second air ring and later followed by injection at the third outer air ring tumbles or rolls the center of the tank moving the hot center up, over and down adjacent the side of the large tank. If this were not accomplished during the period of steeping or cooling of the contents of the large tank, the center would retain heat for long periods of time and overcook. The outer edge would cool rather rapidly and not steep or cook adequately.

Extensive experimentation by your applicant over a period of time utilizing mechanical stirrers provided somewhat satisfactory results. Mechanical stirrers tend to crush or break the kernals of corn during stirring at the end of the cooking-steeping cycle. A desire to produce superior masa led your applicant to develop this equipment and process utilizing air injection for stirring which does not crush the cooked grains of corn.

As a result of the extensive experimentation by your applicant, a sequence of events has been determined as being ideal for producing masa corn. While the sequence may be varied according to the type of corn being utilized and the type of taco shells being prepared therefrom, an automatic control system has been incorporated in this continuation-in-part application. The control system will automatically cook the corn, steep the corn, and cool the corn while periodically rolling the corn with bursts of air. The control system may be varied to vary the length of time of each cycle. Also the control system may be switched from automatic to manual to allow for manual operation. Further, the control system may be utilized to control more than a single cooking vat at one time.

BRIEF DESCRIPTION OF THE DRAWINGS

For an illustration of the construction and operation of the preferred embodiment, reference is made to the attached several views wherein identical reference characters will be utilized to refer to identical or equivalent components throughout the several views.

DESCRIPTION OF THE PREFERRED EMBODIMENT

Figure 1:
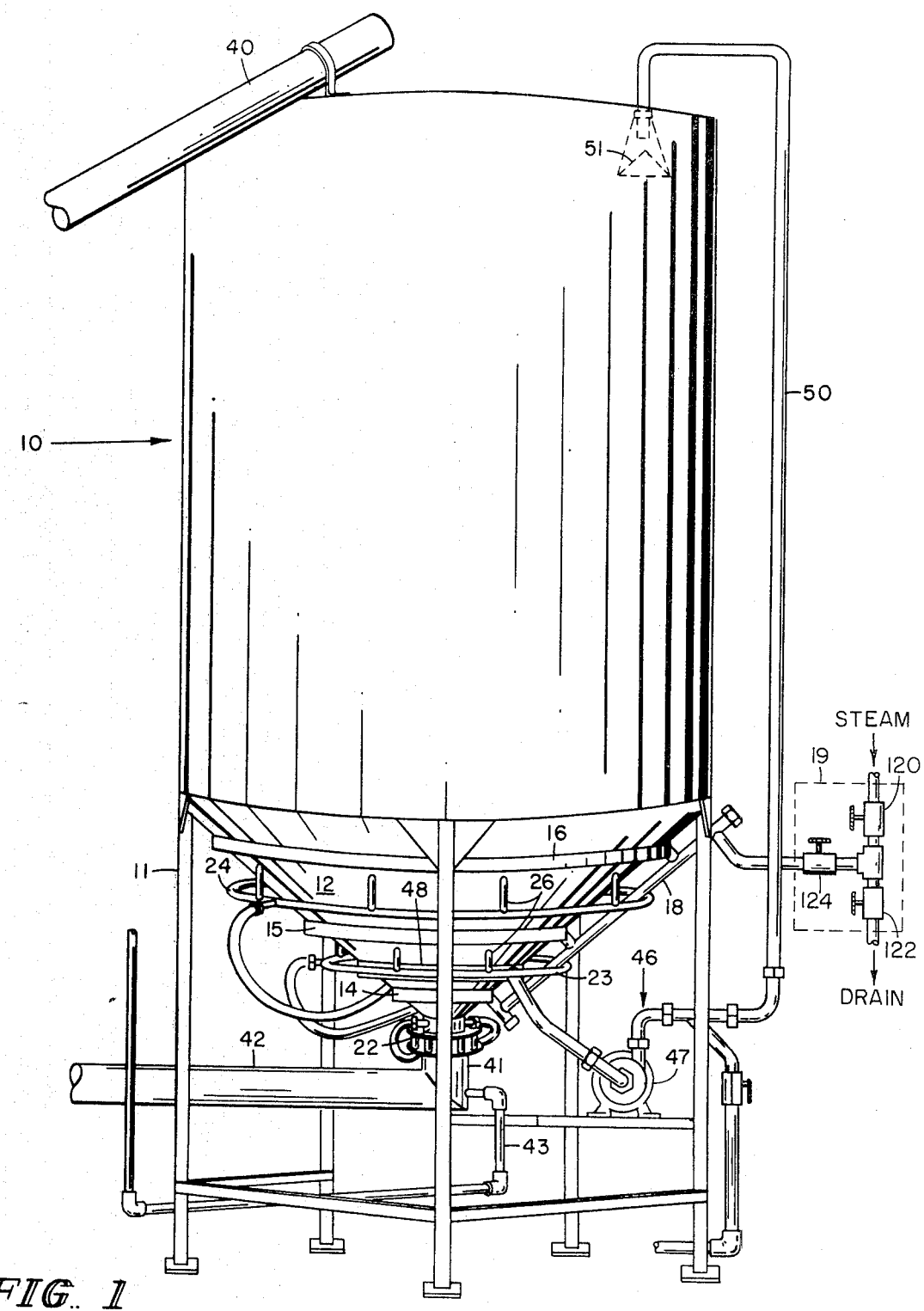
FIG. 1 is a side elevation view of the cooking or steeping tank partially illustrating in fragment the interconnected components.
Figure 2:
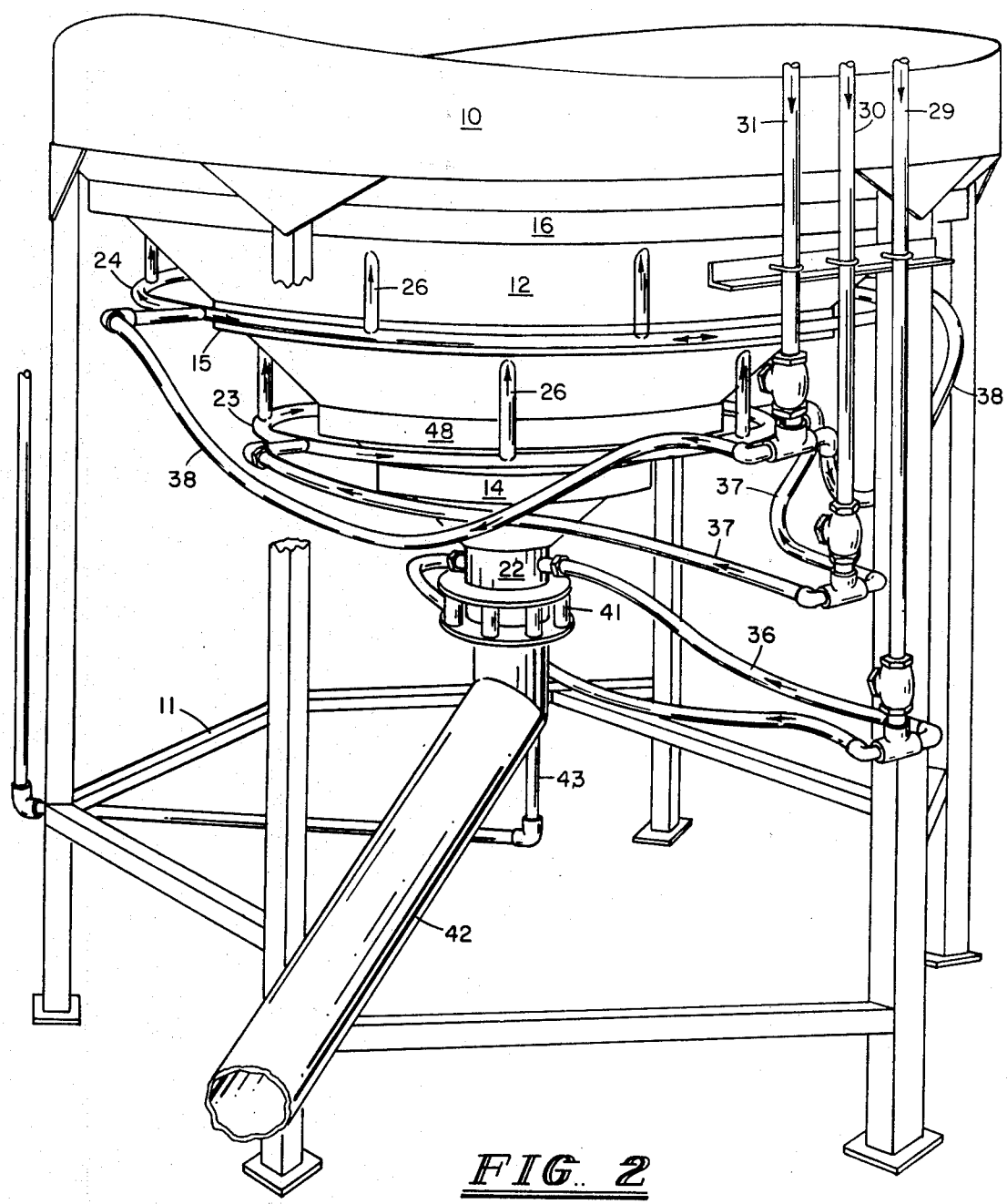
FIG. 2 is a partially fragmented view illustrating air injection side of the tank.
Figure 3:
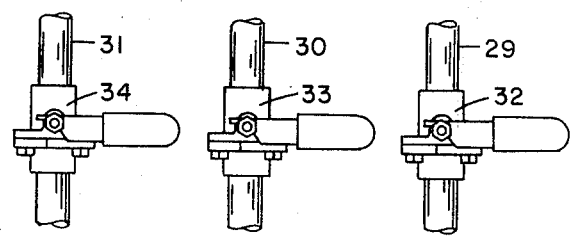
FIG. 3 is a fragmented view of the air injection control valves selectively controlling the emission of compressed air to the various air rings.
Figure 4:
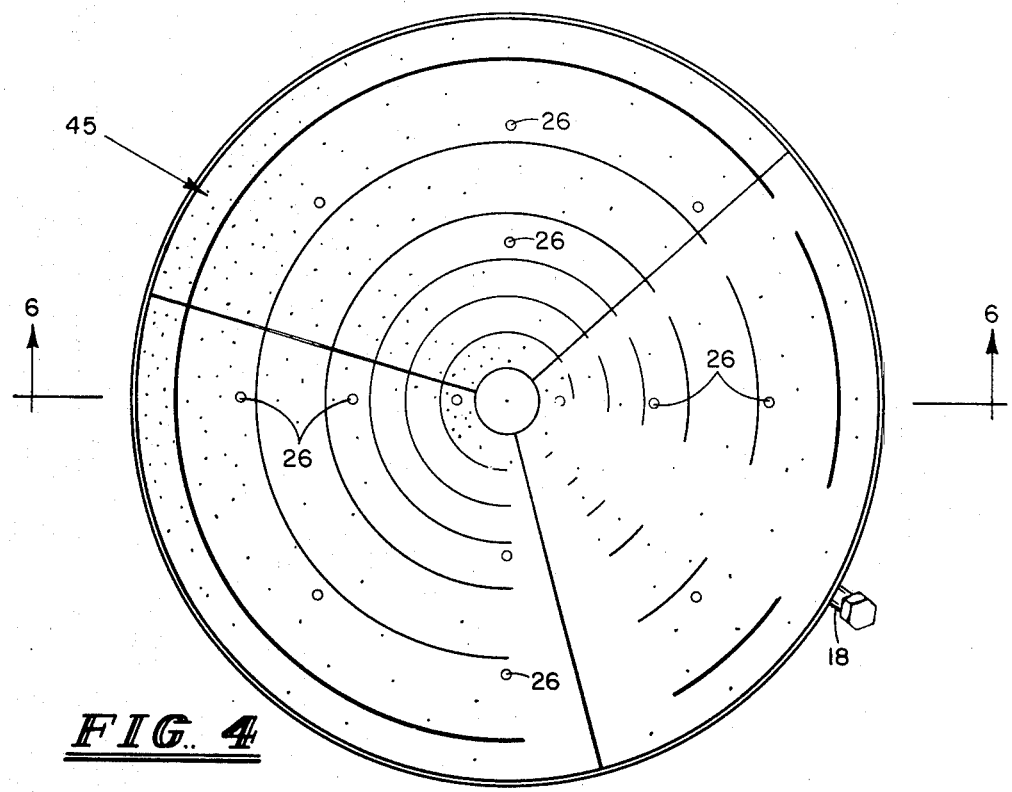
FIG. 4 is an interior view of the tank partially fragmented illustrating the interior of the inverted conical screen in the bottom of the tank.
Figure 5:
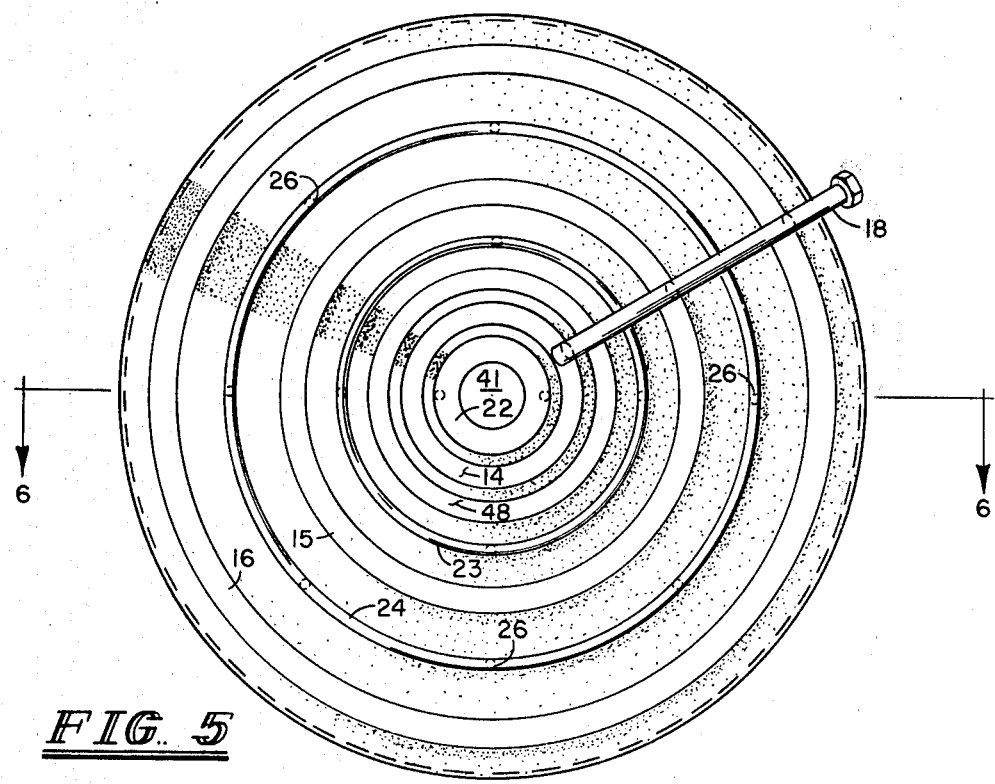
FIG. 5 is a bottom view of the tank illustrating the general arrangement of the steam and air injection rings and the steam manifold, and the water ring.

For a description of the construction and utilization of the preferred embodiment, reference is made to the attached drawings. The steeping tank 10 of FIG. 1 was constructed utilizing fourteen gauge stainless steel to form the outer shell. The seams were welded with heli-arc welding and polished smooth. The frame structure 11, partially illustrated in FIGS. 1, 2, and 4, is of stainless steel construction welded to and supporting the tank 10. The conical bottom 12 of the tank was constructed of fourteen gauge stainless steel generally projecting at an angle of approximately 45 degrees downward from the outer wall of the tank 10. A series of steam rings comprising a first steam ring 14, a second steam ring 15, and a third steam ring 16 are formed from stainless steel angle iron spaced and welded to the conical bottom 12 substantially as illustrated in FIGS. 1, 2 and 4. A series of ⅛" steam inlet holes 17 were drilled through the interior of the conical bottom 12 projecting into the various steam rings. The number of these steam inlet holes 17 might vary; however, in the preferred embodiment, sixty-four evenly spaced ⅛" apertures were utilized in the third steam ring 16. The total area of all the steam inlet holes 17 preferably equals the area of the steam inlet opening from the manifold 18 into the steam rings 14, 15 and 16. Interconnecting the various steam rings 14, 15 and 16 was a steam manifold as best illustrated in FIGS. 1 and 5. This steam manifold 18 is connected to the external source of steam 20 which is controlled by steam valves 19.

Figure 6:
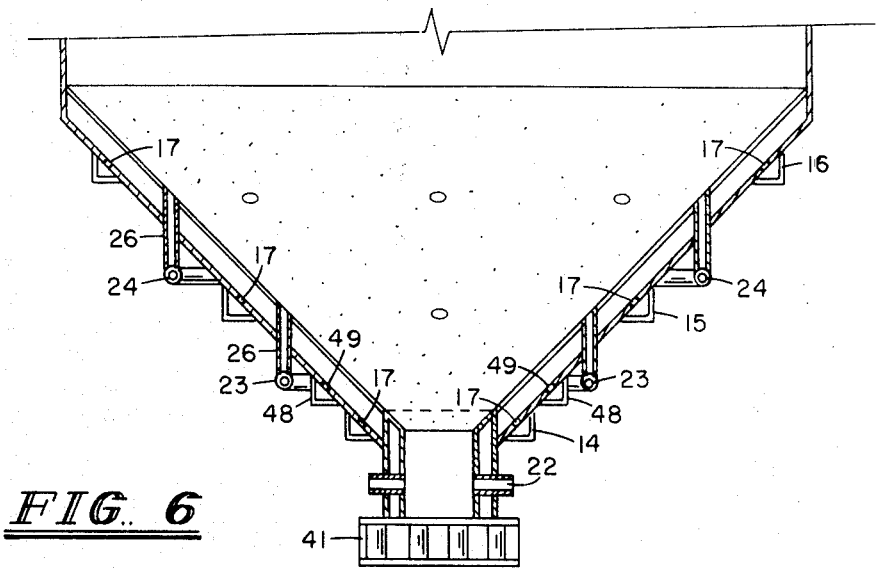
FIG. 6 is a sectional view of the conical bottom of the tank taken generally on the line 6—6 of FIG. 5, looking in the direction of the arrows.
Figure 7:
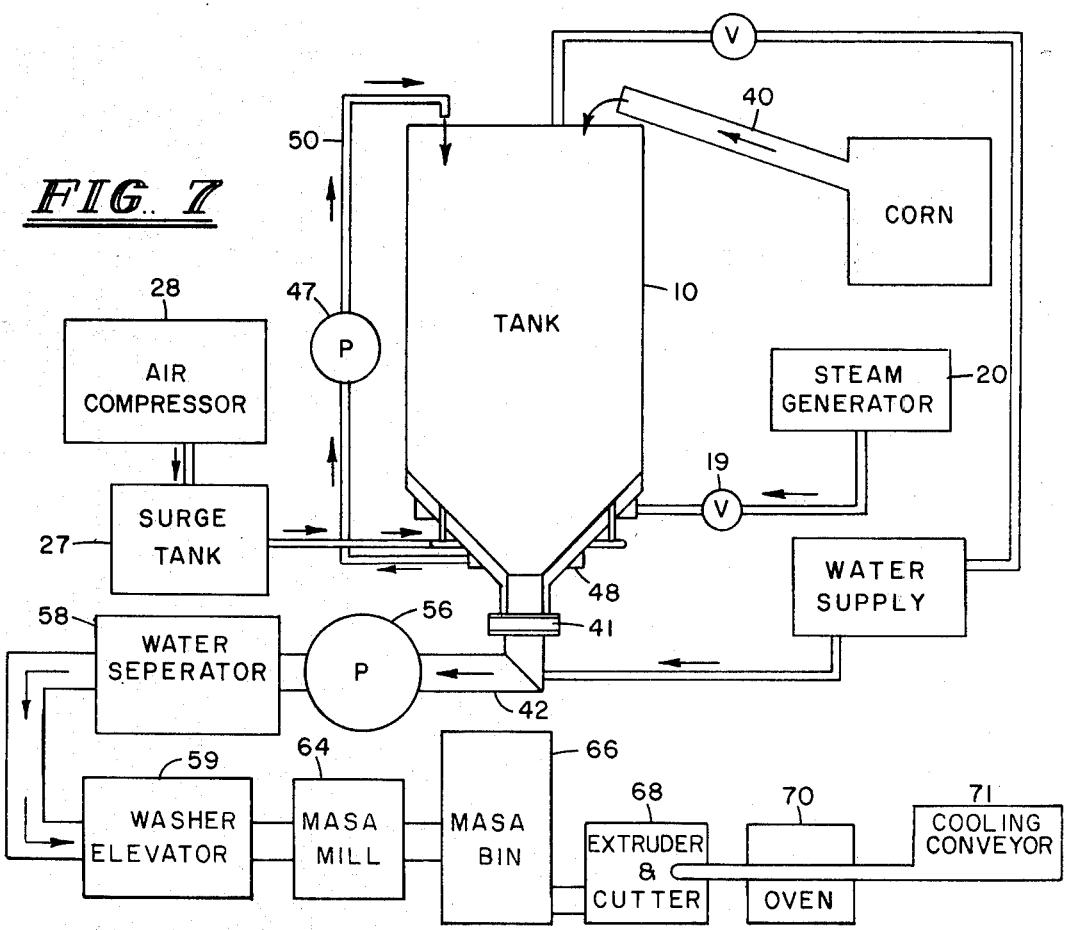
FIG. 7 is a schematic illustration of the assembled components depicting an arrangement of the cooking tank, the external steam supply, the air supply, the liquid recirculating means, and the water and corn separator and washer, masa mill, cutter, oven, and conveyor.

The steam components of this device are utilized in the initial heating or cooking step of the method of this invention. Secured to the conical bottom 12 of this device are multiple air rings illustrated in the various views. The first air ring 22, the second air ring 23, and the third air ring 24 are perhaps best illustrated in FIGS. 1, 2 and 6. These various air rings are spaced from the wall of conical bottom 12 and are interconnected to the device by means of air inlet risers 26. These risers project through the conical bottom of the tank 12 and terminate adjacent the interior surface of conical screen 45 as illustrated in FIG. 4.

As a part of the compressed air system, an air reservoir or surge tank 27 is employed. Supplying air to the air surge tank 27 is an external air compressor 28. This external air compressor 28 is a large capacity compressor employing a 25 horsepower electric motor and is of the type that might be utilized in hospitals for supplying highly purified air for utilization in respirators and related medical uses. The air compressor employs a multiplicity of filters to remove foreign particles from the air. All oil is removed and a refrigerated filter removes all moisture from the air. The air admitted to the device of this invention is and must meet the highest food processing standards.

Interconnecting the air reservoir surge tank 27 is a first air pipe 29, second air pipe 30, and third air pipe 30 into which is positioned first air valve 32, a second air valve 33, and a third air valve 34. These valves, as illustrated in FIGS. 1–7, are manually operated; however, solenoid control valves could be utilized with appropriate timers controlling their cycle operation as shown and described subsequently in conjunction with FIGS. 8 and 9. First, air hose 36 interconnects first air pipe 29 with first air ring 22. A similar arrangement is employed in interconnecting the second air hose 37 and the third air hose 38 to their corresponding air rings 23 and 34. Hoses 36, 37 and 38 are in pairs to distribute air 180 degrees apart for more uniform air injection.

In the overall utilization of this device, steeping tank 10 could be manually loaded; however, an inlet conveyor 40 could be utilized. Positioned in the lower apex of a conical bottom 12 of the tank is an outlet butterfly valve 41 which communicates with an outlet conduit 42 which is preferably six inches in diameter to insure the even flow of the processed corn and liquid from steeping tank 10. An auxiliary water supply 43 may be interconnected to the outlet conduit 42. In the process of cooking or steeping the corn to produce the masa meal, a cycle of operation of approximately 24 hours is required. Interspersed in the various steps of the method or process, it is desirable to periodically recirculate the cooking or steeping liquid within the tank. Water is taken from the area between the conical screen 45 and the conical bottom 12 utilizing the water recirculation means 46 as illustrated in FIG. 1. Fluid recirculating pump 47 employs a centrifugal pump component driven by a three horsepower electric motor. Fluid recirculation pump 47 receives the fluid from water ring 48 which communicates with the interior of the tank 10 through four evenly spaced water apertures 49 in conical bottom 12. Elevator pipe 50 projects upward to the top of steeping tank 10 where it discharges over a spreading cone 51. In the method or process of this invention which will be later described, water recirculation means 46 is activated for a period of approximately three minutes interspersed between the various air injection cycles. A positive displacement pump 56 is interconnected to outlet conduit 42 and discharges corn and liquid from the steeping tank 10 through the conical bottom 12. This pump, powered by a ten horsepower electric motor, moves the liquid and corn from steeping tank 10 through outlet conduit 42 to the water-corn separator 58. The liquid and corn are separated, and the corn passes through a washer 59. The corn may be conveyed by a screw elevator (not illustrated) into a metering device (not shown) which supplies the masa corn to stone grinder 64. The moist, cooked, processed corn, which contains a quantity of absorbed water approximately equal to the weight of the corn, is ground by a stone grinder 64 and produces a dough-like masa which is collected into a masa bin 66. This masa is passed through extruder rollers 68 and cut into tortillas, which are deposited on a cooling conveyor 71. The conveyor passes through an oven 70 and conveyor 71 continues on a multi-level serpentine path to permit the tortillas to cool slightly. The conveyor passes the tortillas to packaging stand where the product may be packaged and boxed. The foregoing, overall process and components for mass cooking and mass production of the tortillas is not considered to be the particular novel portion of this invention. The novelty primarily is believed to reside in the various components and arrangements pertaining to the cooking or steeping tank 10 and the associated steam and air injection rings operably associated with the conical bottom 12. The arrangements of the components permitting the air stirring of large quantities of corn and liquid ranging from 50 to 150 bushels permitting a slow steeping, cooking, or cooling process produces a superior masa of outstanding quality.

METHOD AND OPERATION OF THE DEVICE

In the utilization and operation of the device of this invention, a large cooking or steeping tank 10 may be filled with 50 to 150 bushels of corn, depending on the quantity desired. The tank 10 is then filled with cold water into which is mixed a desired quantity of calcium hydroxide to remove the husks from the corn kernals. When the cooking or steeping tank 10 is filled with the desired quantity of corn and liquid, steam is admitted to the system by opening steam valve 19 leading to the steam manifold 18 resulting in the injection of steam through the steam inlet holes 17 of the various steam rings 14, 15 and 16. Steam is injected into the system until the temperature of the liquid and corn is raised to just at the point of boiling, which is approximately 212 degrees Fahrenheit, at which point the steam is cut off. The mass is allowed to cook and steep in a stationary position for one hour. At this point in the method or process, the air injection step is initiated to insure uniform cooling of the mass. The contents of the tank 10 is stirred by first opening the first air valve 32 admitting air to the first air ring 22 into the bottom center of tank 10 and the air bubbles or flows upward. This process is followed by opening of the second air valve 33 admitting air to the second air ring 23 for a period of time sufficient to cause a bubbling or rolling of the contents of steeping tank 10. This is followed by the step of opening the third air valve 34 admitting air to the third air ring 24. This latter step is continued for a sufficient length of time to create a bubbling up or rolling of the liquid and corn contents of the tank 10. Following this initial air injection process, the water recirculation means 46 is activated for a period of two minutes. This series of steps is repeated again in fifteen minutes. This fifteen minute cycle continues for four hours. The air injection sequence is then reduced to once every half hour for the next four hours. Following this four hour cycle, the air injection and water recirculation steps are taken once every hour for the next four hours. After a period of approximately sixteen hours of steeping or cooling, the masa is ready for the final step of milling and processing. Cyclic step of cooking or steeping corn to produce masa is approximately twenty-four hours. If the corn is a new crop or moist corn, a shorter cooking cycle or steeping cycle may be employed. Drier corn, or an old crop of corn stored in elevators for longer periods of time, require a longer cooking or steeping cycle.

Figure 8:
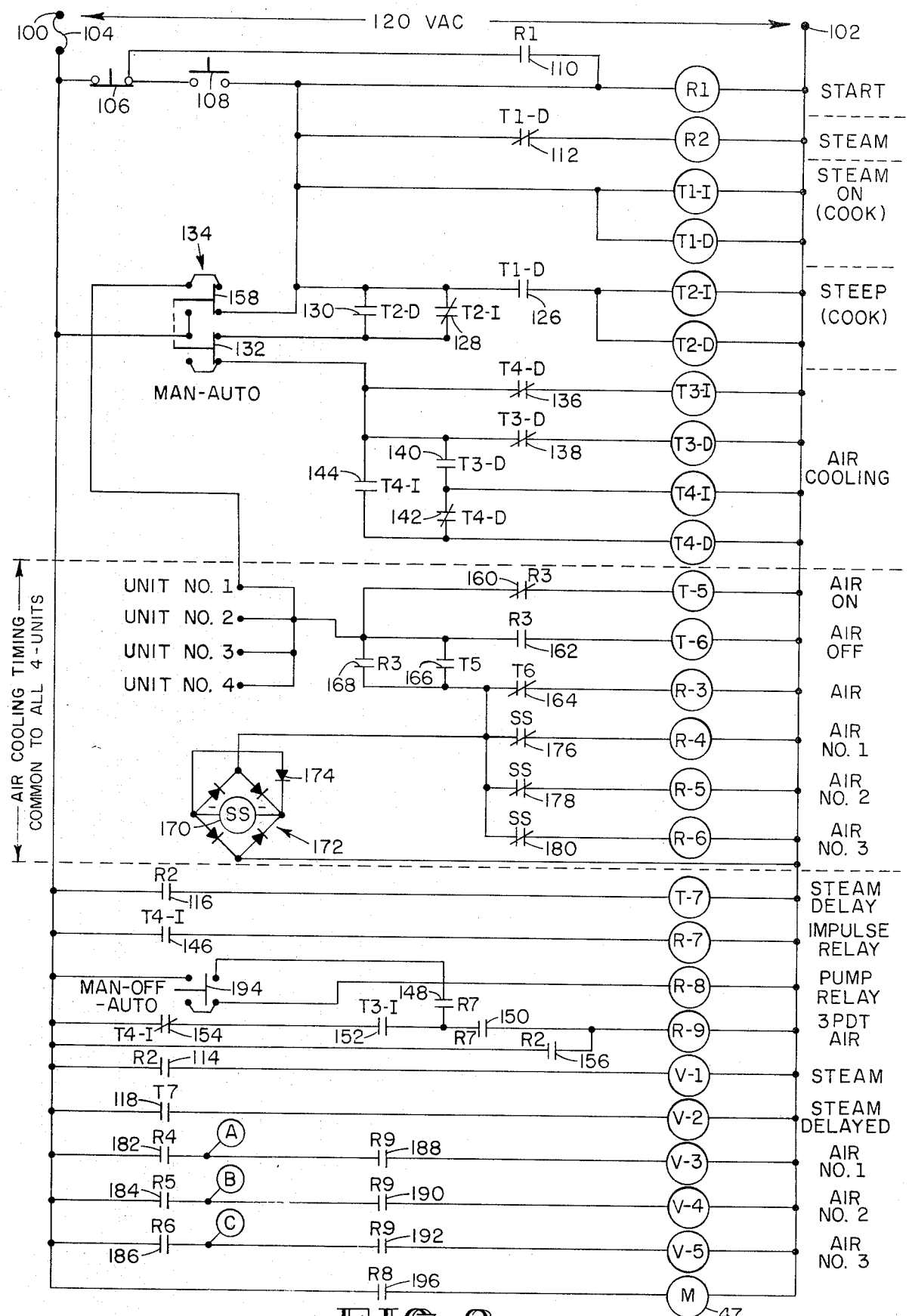
FIG. 8 is a schematic diagram showing one configuration of an electrical control system that may be utilized in operation of the cooking tank shown in FIG. 7 and its external controls.

Referring now to FIG. 8 of the drawings, there is shown a schematic diagram of an automatic control system that can be utilized in the operation of the previously described mechanical system for producing the masa. These controls are for the cooking tank 10 prior to discharging of a corn and liquid through positive displacement pump 56 shown in FIG. 7. Referring to FIG. 8, standard household voltage of 110–120 volts AC is connected between input terminals 100 and 102. One line is protected by fuse 104 in a manner well-known in the industry. Past fuse 104 is a normally closed OFF switch 106, which is connected in series with a normally opened ON switch 108. Upon pushing the ON switch 108, start relay R1 is activated. The activation of start relay R1 closes normally opened R1 contacts 110. This latches relay R1 in the ON position even after ON switch 108 is released until OFF switch 106 is pushed.

Simultaneously with activating start relay R1, relay R2 is activated through normally closed contact 112 of delayed timer T1-D. Timer T1 has a double pole, double throw contact with an instantaneous portion represented by the letter "I" and the delayed portion represented by the letter "D". This same nomenclature will be used for other timers having an instantaneous portion and a delay portion. The activation of relay R2 closes normally opened R2 contacts 114, which in turn activates solenoid valve V1 to open a valve and allow the steam to blow through the line into a drainage to empty condensate out. This only occurs for a couple of seconds because normally opened contact 116 of relay 102 has simultaneously activated relay timer T7. After a matter of seconds, timer T7 closes normally opened contacts 118 of delay timer T7 thereby activating valve V2 to give steam into the tank 10.

Operation of steam valve 19 shown in FIG. 1 is essentially the same as a three-way valve. By activation of V1 as previously described, valves 120 and 122 are opened and valve 124 is closed. By activation of V2, valve 124 is opened. When neither V1 nor V2 is activated, valves 122 and 124 are closed as well as possibly valve 120. Obviously many other types of three-way valving arrangements may be utilized. It is only important that the steam condensate in the line be blown through to the drain, and not into the tank 10. The timing for delay timer T7 is normally about two seconds, but it is a variable timer that has a range of 0–10 seconds. The length of the steam line would determine the time delay that should be set in by timer T7.

Simultaneously with the operation of relays R1 and R2 in FIG. 8, timer T1 has been activated and the delay portion T1-D starts timing. The delay portion of timer T1-D may be set over a range, but typically the period of time would be 30–45 minutes for cooking of the corn. When the delay portion set into timer T1 has expired, normally closed contact 112 will open deactivating relay R2. Upon deactivating relay R2, contact 116 opens deactivating timer T7, contact 114 opens deactivating valve V1 and contact 118 of timer T7 opens deactivating valve V2. Also, normally opened contact 126 of timer T1-D is closed thereby starting timer T2 with immediate activation of the instantaneous portion and starting the timing of the delay portion. Normally closed contact 128 of timer T2-I is opened. Until timer T2-D has timed out, the corn that has previously been heated by steam will simply sit and steep. During steeping, the corn is still cooking due to the heat previously applied during the steaming cycle. Steeping is basically letting something sit in a hot condition. The steeping or the delay set in by timer T1-D may range from 30–60 minutes. The timer T2-D can be varied from 1 minute to 99 minutes. Normally for older corn, the steeping would be for a longer period of time than it would be for new corn.

After timer T2-D has timed out, normally opened contact 130 will be closed thereby providing current flow through contactor 132 of manual/auto switch 134. Thereafter, a current path is provided through normally closed contact 136 of timer T4-D to timer T3-I. Also current path is provided through normally closed contact 138 of timer T3-D to the coil for timer T3-D. When timer T3-D times out, normally closed contact 138 will open and normally opened contact 140 will close thereby providing a current path to the coil of timer T4-I, and through contact 142 of timer T4-D, to the coil of T4-D. Activation of timer T4-I closes normally opened contact 144 of timer T4-I.

By the arrangement just described, timers T3 and T4 operate so that one is ON during the period of time that the other is OFF.

After timer T3-D has timed out, timer T4-I closes normally opened contact 146 to activate impulse relay R7. The activation of impulse relay R7 switches the state of contacts 148 and 150. At all times, either contact 148 or 150 will be closed and the other opened. These contacts 148 and 150 will remain in that condition until another impulse is received by impulse relay R7. Three pole, double throw relay R9 operates each time that timer T3-I is activated via normally opened contact 152 and normally closed contact 154 of timer T4-I. Also three pole, double throw relay R9 is activated instantaneous upon turning ON power through normally opened contact 156 of relay R2.

Also upon applying power through the ON switch 8, if the manual/auto switch 134 is in the automatic position, current is supplied through contactor 158 to timer T5 via normally closed contact 160 of relay R3, to timer T6 upon activating relay R3 via normally opened contact 162, and to relay R3 via normally closed contact 164 of timer T6 in conjunction with either normally opened contact 166 of timer T5 or normally opened contact 168 of relay R3. Timer T5 is a delay timer, as well as timer T6. When timer T5 activates after its delay, normally opened contact 166 will be closed thereby activating relay R3. The connections in conjunction with timers T5, T6 and relay R3 operate in such a manner that if T5 is ON, T6 is OFF, and vice versa in a manner similar to timers T3 and T4 previously described. The amount of time that the air is ON is controlled by timer T5 and the amount of time that the air is OFF is controlled by timer T6. Timer T5 normally has a delay of approximately 0.5 seconds and may range anywhere from a quarter of a second to a second. Timer T6 has a delay of approximately 5 seconds. From the time power is turned ON by ON switch 108 until it is turned OFF by OFF switch 106, timers T5 and T6 will be cycling as long as the manual/auto switch 134 is in the auto position. This simultaneously causes stepping switch 170 to operate as the center of diode bridge 172 with diode 174 being connected thereacross. Stepping switch 107 operates contacts 176, 178 and 180 in sequential order. Contact 176 will close for approximately one-half second thereby activating relay R4 for approximately one-half second, after a ten second delay, contact 178 will close operating R5 for approximately one-half second, and after another ten second delay, contact 180 will close for approximately one-half second thereby activating relay R6. This occurs continually as long as power is ON and manual/auto switch 134 is in the auto position.

Activation of relay R4 closes R4 contact 182 for approximately one-half second, activation of relay R5 closes R5 contact 184 for approximately one-half second, and activation of relay R6 closes R6 contact 186 for approximately one-half second. Therefore, if three pole, double throw relay R9 is activated so that its contacts 188, 190 and 192 are closed, valves V3, V4 and V5 will be activated to give sequential blasts of air into the tank 10 every 10 seconds. Valves V3, V4 and V5 correspond to valves 32, 33 and 34, respectively. By use of the blast of air, the corn inside of the tank 10 is rolled in a manner that does not create damage. Particularly note that the corn is periodically rolled during the period of time that steam is being applied because relay R9 is activated through contact 156 of relay R2. Also, when timer T3-I is activated closing contact 152, relay R9 is again activated thereby allowing periodic blasts of air to the corn. It is only during stepping that air is not periodically applied to roll the corn.

In the present system, it is envisioned that as many as four tanks will be operated simultaneously; however, it can be any particular number of tanks. These various tanks are referred to as Unit No. 2, Unit No. 3 and Unit No. 4. Any one of these particular units may provide the inputs to operate timers T5 and T6 as shown. Also, connections A, B and C as pictorially illustrated are electrical connections that would operate valves for other tanks simultaneously with the operation of the valves V3, V4 and V5 for the unit described hereinabove.

There is also provided a pump switch 194 that may be operated in either the automatic or manual mode. The pump switch 194, when operating in the manual mode, will simply be turned ON when it is necessary to pump an excess amount of water off of the corn. In the automatic mode, the pump 194 would be activated during the time that timer T3-D was timing out. Whether operated automatically or manually, activation of relay R8 will close normally open contact 196 of relay R8 thereby operating the motor M which corresponds with pump 47. Operation of pump 47 will circulate the fluid inside of tank 10. After the cooling step has occurred, then power is turned OFF by pushing OFF switch 106.

If the operator wants to stir the corn during steeping, the operator may switch manual/auto switch 34 to the manual mode at which time blasts of air through valves V3, V4 and V5 will roll the corn as previously described in conjunction with the stepping switch 170. This depends upon whether or not the operator deems it desirable to stir the corn by blasts of air during steeping. Likewise, fluid inside of tank 10 may be circulated by pump 47 by moving pump switch 194 to the manual position.

Figure 9:
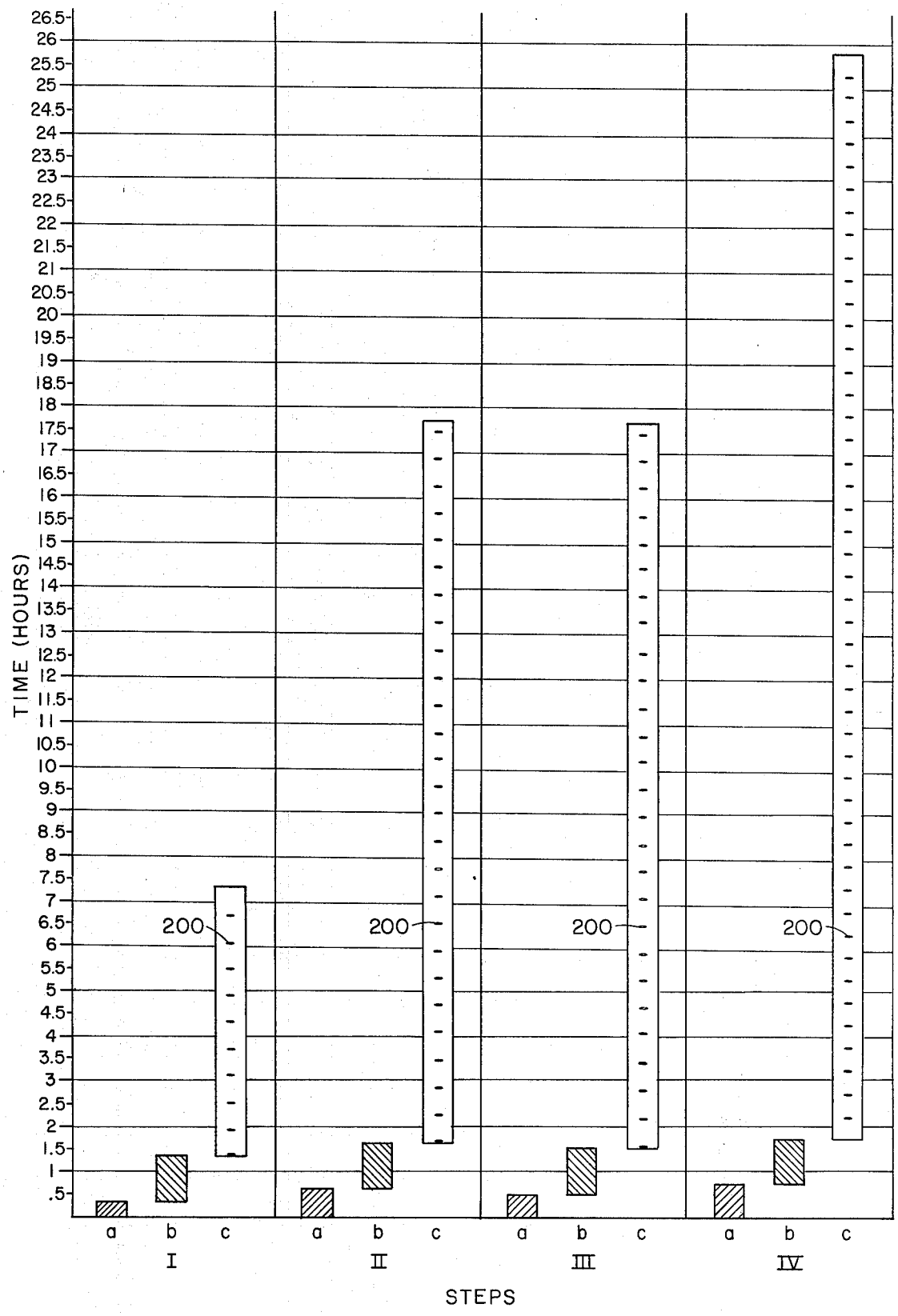
FIG. 9 is a timing diagram showing typical cycles of events inside of the cooking tank.

Referring now to FIG. 9, there is shown a timing chart illustrating the sequence of steps used in producing corn masa in accordance with the teachings of the present invention. The chart is divided into four parts with each part having a steam cycle represented by the letter "a", a steeping cycle represented by the letter "b", and a cooling and soaking cycle represented by the letter "c". It should be realized that the times may be varied according to the type of product that is to be produced.

Referring first to part I, a cooking time "a" of approximately 18 minutes is provided. The corn may or may not be rolled during the cooking time of 18 minutes. Thereafter, the corn is allowed to steep for approximately 60 minutes. After steeping for approximately 60 minutes, the corn is cooled and soaked as indicated by "c" for approximately 6 hours alternating three minute air cycles for stirring the corn after 35 minutes of dwell throughout the 6 hour cycle. The three minute air blasts are indicated by marks 200 on the timing chart.

Referring next to part II, a typical taco shell called Happy Jose made from white corn is shown. The cooking time "a" of 35 minutes is provided. The corn may or may not be stirred during this cooking cycle. Thereafter, the corn is allowed to steep for approximately 16 hours as indicated by the letter "b". Next, the corn is allowed to cool and soak as indicated by the letter "c" for approximately 16 hours with alternating blasts of air for approximately 3 minutes after 35 minutes of dwell throughout the 16 hour cycle.

Referring to part III of the timing chart, there is shown the cycle for making taco shells, such as Happy Jose, from yellow corn. The cooking time "a" is approximately 30 minutes. The corn may or may not be rolled by blasts of air during the cooking time. Thereafter, the corn is steeped for approximately 60 minutes as indicated by the letter "b". Next, during cooling and soaking of approximately 16 hours as indicated by the letter "c", the corn is rotated by alternating three minute blasts of air after thirty minutes of dwell throughout the cooling and soaking cycle.

Referring to part IV, a typical cooking cycle of an Amigo's brand taco shell is shown. The cooking time is approximately 47 minutes and corn may be rolled during the cooking time by periodic blasts of air. Next, during the steeping as indicated by the letter "b", the corn is basically inactive for approximately 60 minutes. Next, during cooling and soaking indicated by the letter "c", for approximately 24 hours there are alternating 5 minute air blasts after 60 minutes of dwell throughout the 24 hour cycle.

I claim:

1. A control system for preparing large quantities of food products such as masa comprising:
   first valving means for providing steam to a vat containing said food products soaking in a solution such as water;
   first timing means for controlling said first valving means thereby controlling a first predetermined time period for cooking said food products;
   second timing means to allow said food products to steep after said cooking for a second predetermined time period;
   stepping means connected to said second timing means;
   second valving means being operated by said stepping means after expiration of said second predetermined time period to provide short sequential blasts of air to said vat to roll said food products during cooling;
   third timing means for interrupting said short sequential blasts of air for third predetermined time periods, said cooling being considerably longer than said third predetermined time period.

2. The control system as recited in claim 1 having manual means to bypass said first timing means and said second timing means to provide said short sequential blasts of air to roll said food products.

3. The control system as recited in claim 2 wherein said first, second and third timing means are adjustable to allow for different time sequences for different food products.

4. The control system as recited in claim 3 further including pump means controlled by said second valving means to circulate said solution in said vat, said pump means also having manual controls.

5. The control system as recited in claim 3 wherein said stepping means controls additional second valving means for additional vats, simultaneously.

6. An apparatus for producing masa comprising:
   a. a large steeping tank having an opening at the top of said tank;
   b. bottom means for said tank;
   c. steam injection means operably attached to said bottom adapted to admit steam to the interior of said tank to heat the contents;
   d. air injection means operably attached to said bottom adapted to control the injection of air into the interior of said steeping tank, stirring the contents of said tank; and
   e. means for controlling said steam injection means and said air injection means, said control means comprising valving means for allowing the injection of air and steam into said tank and timing means to control the amount of time necessary for cooking, steeping, and cooling of said masa.

7. The apparatus of claim 6 wherein said valving means comprises a first valving means injecting air and steam into said steeping tank to cook said masa and a second valving means injecting short sequential blasts of air to said steeping tank to roll said masa during cooling of same.

8. The apparatus of claim 7 wherein said timing means comprises:
   a first timing means controlling said first valving means to control a first predetermined time period for cooking said masa;
   a second timing means to allow said masa to steep for a second predetermined time period after said cooking, and a third timing means for interrupting said short sequential blasts of air from said second valving means for a third predetermined time period, said cooling being considerably longer than said third predetermined time period.

9. The apparatus of claim 6 wherein said control means has manual means to bypass said first timing means and said second timing means to provide said short sequential blasts of air to roll said masa.

10. The apparatus of claim 8 wherein said first, second and third timing means of said control means are adjustable to allow for different time sequences for different masa food products.

11. The apparatus of claim 10 further including pump means controlled by said second valving means of said control means to circulate said masa food products in said tank, said pump also having manual controls.

12. An apparatus for producing masa comprising:
   a. a large steeping tank having an opening at the top of said tank;
   b. a conical bottom securely affixed to said tank;
   c. a multiplicity of concentric steam rings comprising steam injection means operably attached to said conical bottom adapted to admit steam to the interior of said tank, heating the contents;
   d. a multiplicity of concentric air rings comprising air injection means operably attached to said conical bottom adapted to selectively control the injection of air through said concentric air rings into the interior of said steeping tank;
   e. means for controlling said steam injection means and said air injection means, said control means comprising:
   a first valving means for injecting steam into said steeping tank;
   first timing means for controlling said first valving means thereby controlling a first predetermined time period for cooking said masa;
   second timing means to allow said masa to steep after said cooking for a second predetermined time period;
   stepping means connected to said second timing means;
   second valving means operated by said stepping means after expiration of said second predetermined time period to provide short sequential blasts of air to said tank to roll said masa during cooling; and third timing means for interrupting said short sequential blasts of air for a third predetermined time period, said cooling being considerably longer than said third predetermined time period.

* * * * *